United States Patent [19]

Hergenrother et al.

[11] 4,221,900
[45] Sep. 9, 1980

[54] POLYPHOSPHAZENE COPOLYMERS CONTAINING SUBSTITUENTS DERIVED FROM SUBSTITUTED 2-NITROETHANOLS

[75] Inventors: William L. Hergenrother, Akron; Adel F. Halasa, Bath, both of Ohio

[73] Assignee: The Firestone Tire & Rubber Company, Akron, Ohio

[21] Appl. No.: 12,620

[22] Filed: Feb. 16, 1979

[51] Int. Cl.³ ............... C08G 79/02; C08G 73/00
[52] U.S. Cl. ..................... 528/168; 528/374; 528/399
[58] Field of Search ............ 528/168, 399, 374

[56] References Cited

U.S. PATENT DOCUMENTS 3,370,020  2/1968  Allcock et al. ............ 528/399

FOREIGN PATENT DOCUMENTS 2712542  9/1977  Fed. Rep. of Germany .......... 528/399

Primary Examiner—Wilbert J. Briggs, Sr.

[57] ABSTRACT

Polyphosphazene polymers are prepared which contain units represented by the formulas:

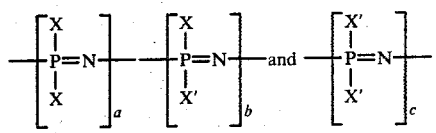

wherein X is

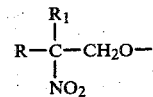

in which R and $R_1$ are selected from the group consisting of alkyl groups containing from 1 to 12 carbon atoms, cycloalkyl groups containing from 3 to 12 carbon atoms and aryl groups wherein X' is selected from the group consisting of substituted or unsubstituted alkoxy, aryloxy, amino and mercapto groups and wherein $\leq 20(a+b+c) \leq 50{,}000$ per polymer.

The copolymers of the invention can be utilized to form films and may also be utilized in applications such as moldings, coatings, foams and the like.

9 Claims, No Drawings

POLYPHOSPHAZENE COPOLYMERS CONTAINING SUBSTITUENTS DERIVED FROM SUBSTITUTED 2-NITROETHANOLS

BACKGROUND OF THE INVENTION

This invention relates to polyphosphazene copolymers containing repeating $\text{-}[P\text{=}N]\text{-}$ units in the polymer chain in which substituents derived from substituted 2-nitroethanols are attached to the phosphorus atom. More particularly, the invention relates to polyphosphazene copolymers containing substituents represented by the structure:

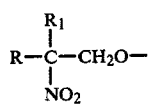

(defined hereinafter) and other compatible substituents.

Polyphosphazene polymers containing repeating $\text{-}[P\text{=}N]\text{-}$ units in which various alkoxy, aryloxy, amino and mercapto groups are attached to the phosphorus atom and their method of preparation are described in the prior art as illustrated in the publication "Phosphorus-Nitrogen Compounds", Academic Press, New York, New York 1972 by H. R. Allcock and "Poly(Organophosphazenes)", Chemtech, Sept. 19, 1975 by H. R. Allcock and in such U.S. Pat. Nos. as 3,515,688; 3,702,833; 3,856,712; 3,974,242; and 4,042,561, the disclosures of which are herein incorporated by reference.

SUMMARY OF THE INVENTION

In accordance with this invention, polyphosphazene copolymers are prepared which contain units represented by the formulas:

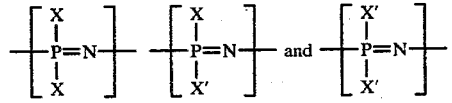

wherein X is

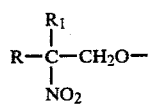

in which R and $R_1$ are selected from the group consisting of alkyl groups containing 1 to 12 carbon atoms, cycloalkyl groups containing from 3 to 12 carbon atoms and aryl groups, and wherein X' is selected from the group consisting of substituted or unsubstituted alkoxy, aryloxy, amino and mercapto groups.

In the copolymer units represented by the above formulas, all X substituent groups may be the same or they may be mixed and all X' substituent groups may be the same or mixed. In the mixtures, the X substituent groups may be mixtures of substituents derived from different substituted 2-nitroethanols and the X' substituent groups may be mixtures of substituted or unsubstituted alkoxy, aryloxy, amino and mercaptan groups or mixtures of different groups within each class.

The specific proportion of X to X' substituent groups incorporated in the polymers of the invention may vary considerably depending upon chemical and physical properties desired in the polymer and the particular end use for which the polymer is intended. Thus, for applications such as moldings, coatings, foams and the like, the polymer should contain at least 10 mole percent by weight of the X substituent.

The copolymers are prepared by reacting a poly(dichlorophosphazene) having the formula $-(NCl_2)_n-$ in which n is from 20 to 50,000 with a substituted 2-nitroethanol compound and a substituted or unsubstituted aliphatic alcohol, aromatic alcohol, amino compound or mercaptan compound.

DETAILED DESCRIPTION OF THE INVENTION

The term "copolymer" as employed hereinafter throughout this specification and claims is utilized in its broadest sense and includes polyphosphazene copolymers, terpolymers, tetrapolymers and the like.

I. THE POLY(DICHLOROPHOSPHAZENE) POLYMER

Poly(dichlorophosphazene) polymers which are employed as starting materials in preparing the polymers of this invention are well known in the art as illustrated in U.S. Pat. Nos. 3,370,020; 4,005,171; and 4,055,520, the disclosures of which are incorporated herein by reference.

These polymers have the general formula $-(NCl_2)_n-$, in which n may range from 20 to 50,000 or more. As described in the aforementioned references, the polymers are in general prepared by the thermal polymerization of cyclic oligomers having the formula $-(NCl_2)_n-$, in which n is an integer of from 3 to 7, with the cyclic trimer and tetramer often comprising up to 90% of the oligomers.

The specific conditions of temperature, pressure and time employed in the thermal polymerization of the cyclic oligomers can vary considerably depending on whether or not the polymerization is catalyzed. Thus, temperatures may range from about 130° C. to about 300° C., pressures may range from a vacuum of less than about $10^{-1}$ Torr to superatmospheric and times may range from 30 minutes to about 48 hours.

A preferred process for preparing the poly(dichlorophosphazene) polymers used in the process of this invention is described in the aforementioned incorporated U.S. Pat. No. 4,005,171.

II. THE SUBSTITUENTS DERIVED FROM SUBSTITUTED 2-NITROETHANOLS

As indicated, the copolymers of the invention contain substituent groups derived from substituted 2-nitroethanols. These substituent groups are represented by the formula

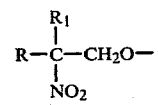

wherein R and $R_1$ are as defined above.

Illustrative examples of substituted 2-nitroethanols which may be utilized in forming the copolymers of the invention include 2,2-dimethyl-2-nitroethanol, 2,2-diethyl-2-nitroethanol, 2,2-diphenyl-2-nitroethanol, 2-ethyl-2-nitro-1-butanol, 2-phenyl-2-nitro-1-propanol, 2-cyclohexyl-2-nitro-1-propanol, 2-methyl-2-nitro-1-propanol, and the like.

III. THE ALKOXY, ARYLOXY, AMINO AND MERCAPTO SUBSTITUENTS

As indicated heretofore, the polyphosphazene polymers of the invention in addition to the

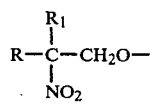

substituent group may contain as the X' substituent substituted or unsubstituted alkoxy, aryloxy, amino or mercapto groups.

The alkoxy groups (substituted or unsubstituted) may be derived from aliphatic alcohols having from 1 to 20 carbon atoms such as methanol, ethanol, propanol, isopropanol, n-butanol, sec-butanol, hexane, dodecanol and the like; fluoroalcohols, especially those represented by the formula $Z(CF_2)_nCH_2OH$ in which Z is hydrogen or fluorine and n is an integer from 1 to 10 as illustrated by trifluoroethanol, 2,2,3,3,3-pentafluoropropanol, 2,2,3,3,4,4,4-heptafluorobutanol; 2,2,3,3-tetrafluoropropanol; 2,2,3,3,4,4,5,5-octafluoropentanol; 2,2,3,3,4,4,5,5,6,6,7,7-dodecafluoroheptanol and the like. In instances where it is desired to incorporate mixed X' substituent groups in the copolymers, mixtures of the foregoing alcohols may be employed.

The aryloxy groups (substituted or unsubstituted) may be derived from aromatic alcohols including among others phenol; alkylphenols such as cresols, xylenols, p-, o-, and m- ethyl and propyl phenols and the like; halogen-substituted phenols such as p-, o-, and m-chloro and bromo phenols and di- or tri-halogen substituted phenols and the like; and alkoxy-substituted phenols such as 4-methoxyphenol, 4-(n-butoxy) phenol and the like. Mixtures of the foregoing aromatic alcohols may also be employed.

The amino groups may be derived from any of the amino compounds heretofore employed in the polyphosphazene polymer art. Thus, the amino groups may be derived from aliphatic primary and secondary amines such as methylamine, ethylamine, dimethylamine, ethylmethylamine and the like and aromatic amines such as those described in U.S. Pat. No. 4,042,561, incorporated herein by reference, as illustrated by aniline, halogen-substituted anilines, alkyl-substituted anilines, alkoxy-anilines, alkoxy-substituted anilines and the like.

The mercapto groups may be derived from any of the mercaptan compounds heretofore employed in the polyphosphazene polymer art. Thus, for example, the mercaptan compounds described in U.S. Pat. No. 3,974,242 to Lanier et al, incorporated herein by reference, may be utilized. Representative of suitable mercaptan compounds as described in the aforementioned patent are methyl mercaptan and its homologs ethyl, propyl, butyl, aryl and hexyl mercaptans, thiophenol, thionaphthols, benzyl mercaptan, cyclohexyl mercaptan and the like.

The preferred substituent groups represented by X' for use in the polymers of the invention are alkoxy groups, especially fluoroalkoxy groups and aryloxy groups.

As mentioned heretofore, the polymers of the invention are prepared by reacting the poly(dichlorophosphazene) polymer, the substituted 2-nitroethanol compound and other desired reactants (e.g. aliphatic or aromatic alcohol, amino compound, mercaptan compound etc.) in the presence of a tertiary amine.

IV. THE TERTIARY AMINE

The use of the tertiary amine in preparing the copolymers of the invention minimizes undesirable side reactions and at the same time acts as an effective acid scavenger.

Tertiary amines which may be employed in preparing the copolymers of the invention are those represented by the general structure:

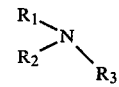

wherein $R_1$, $R_2$, and $R_3$ may each be alkyl containing from 1 to 8 carbon atoms. Thus, for example, the tertiary amine may be a trialkyl amine such as trimethylamine, triethylamine, tri-isopropylamine, tri-n-propylamine, tri-isobutylamine, tri-n-butylamine, and the like. In addition, tertiary amines such as pyridine, N,N,N',N'-tetramethylethylene diamine (TMEDA), dipipyridyl ethane, 1,4 diaza bicyclo (2.2.2) octane (DABCO), N-methyl pyrolle and N-methyl morpholine can also be utilized.

The preferred tertiary amines for use in preparing the copolymers of the invention are triethylamine, N,N,N',N'-tetramethylethylene diamine and pyridine.

The specific reaction conditions and proportion of ingredients employed in preparing these copolymers can vary somewhat depending on factors such as the reactivity of the specific substituent or substituent mixture utilized, the particular tertiary amine employed, and the degree of substitution desired in the finished polymer. In general, reaction temperatures may range from about 25° C. to about 200° C. and times may range from 3 hours up to 7 days; lower temperatures necessitating longer reaction times and higher temperatures allowing shorter reaction times. These conditions are, of course, utilized in order to obtain the most complete reaction possible, i.e., in order to insure substantially complete conversion of the chlorine atoms in the polymer to the corresponding ester of the substituent mixture.

The above reaction is ordinarily carried out in the presence of a solvent. The solvent or solvent mixture employed in the reaction should be a solvent for the poly(dichlorophosphazene) polymer, the substituent mixture and the tertiary amine.

In addition, the materials in the reaction zone should be reasonably free of water, most preferably containing 0.01 percent by weight of water or less. The prevention of water in the reaction system is necessary in order to inhibit the reaction of the available chlorine atoms in the chloropolymer therewith. Examples of suitable solvents which may be employed include diglyme, triglyme, tetraglyme, toluene, xylene, cyclohexane, chloroform, dioxane, dioxalene, methylene chloride, tetrachloroethane, and tetrahydrofuran. The amount of solvent or solvent mixture employed is not critical and any amount sufficient to solubilize the reaction mixture materials can be employed.

In general, the amount of the substituent mixture employed in the process should be at least molecularly equivalent to the number of available chlorine atoms in the polymer mixture. However, if desired, an excess of such compounds may be employed in order to insure substantially complete reaction of all the available chlorine atoms.

The following examples are submitted for the purpose of further illustrating the nature of the present invention and is not intended as a limitation on the scope thereof. Parts and percentages referred to in the examples are by weight unless otherwise indicated.

EXAMPLE 1

Preparation of

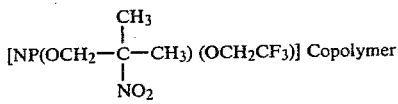
[NP(OCH$_2$—C(CH$_3$)(NO$_2$)—CH$_3$) (OCH$_2$CF$_3$)] Copolymer

To a 10 oz. bottle was added 5.24 grams (44 millimoles) of 2,2-dimethyl-2-nitroethanol, 100 cc of dry tetrahydrofuran (hereinafter THF) and 12.3 cc of dry triethylamine. Then, 40.2 grams (40.2 millimoles) of an 11.6 percent solids solution of poly(dichlorophosphazene), having a degree of polymerization of about 2600 in THF was added, and the solution was heated to 120° C. for 20 hours. Upon cooling, a brown solution with needles of triethylamine hydrochloride was observed. To this solution was added 3.2 cc (44 millimoles) of trifluoroethanol was added followed by heating for another 20 hours at 120° C. The IR solution spectra showed a ratio of the 600 cm$^{-1}$ P—Cl bond to the 625 cm$^{-1}$ base line of (75.2% T/76.0% T) indicating complete reaction. Coagulation in hexane produced 6.0 grams of a tan colored polymeric product having a Tg of 13° C. and a Tm of 172° C.

EXAMPLE 2

Preparation of

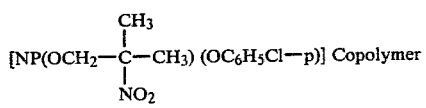
[NP(OCH$_2$—C(CH$_3$)(NO$_2$)—CH$_3$) (OC$_6$H$_5$Cl—p)] Copolymer

In this example, the procedure of Example 1 was substantially repeated except that 4.43 cc (44 millimoles) of p-chlorophenol was used in place of the trifluoroethanol. The resultant product consisted of 7.4 grams of a tan rubbery copolymer.

We claim:

1. A polyphosphazene copolymer containing units represented by the formulas:

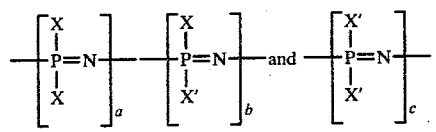

wherein X is

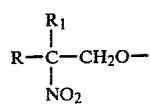

in which R and R$_1$ are selected from the group consisting of alkyl groups containing from 1 to 12 carbon atoms, cycloalkyl groups containing from 3 to 12 carbon atoms and aryl groups; wherein X' is selected from the group consisting of substituted or unsubstituted alkoxy, aryloxy, amino and mercapto groups and wherein $\leq 20$ (a+b+c)$\leq 50,000$ per polymer.

2. The copolymer of claim 1 wherein X is

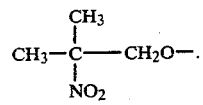

3. The copolymer of claim 1 wherein X is

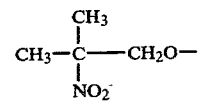

and X' is CF$_3$CH$_2$O—.

4. The copolymer of claim 1 wherein X is

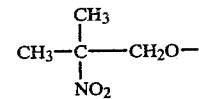

and X is p—ClC$_6$H$_5$O—.

5. A method of preparing polyphosphazene copolymers containing units represented by the formulas:

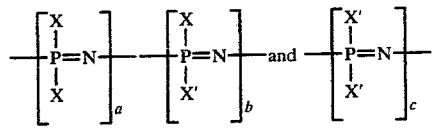

wherein X is

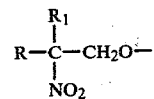

in which R and R$_1$ are selected from the group consisting of alkyl groups containing from 1 to 12 carbon atoms, cycloalkyl groups containing from 3 to 12 carbon atoms and aryl groups; wherein X' is selected from the group consisting of substituted or unsubstituted alkoxy, aryloxy, amino and mercapto groups and wherein $\leq 20$ (a+b+c)$\leq 50,000$; said method comprising reacting a poly(dichlorophosphazene) having the formula —(NPCL$_2$)$_n$—, in which n is from 20 to 50,000 with a substituted 2-nitroethanol compound and an aliphatic alcohol, aromatic alcohol, amino compound or mercaptan compound in the presence of a tertiary amine.

6. The method of claim 5 wherein said substituted 2-nitroethanol is 2,2-dimethyl-2-nitroethanol.

7. The method of claim 5 wherein said substituted 2-nitroethanol is 2,2-dimethyl-2-nitroethanol and said aliphatic alcohol is trifluoroethanol.

8. The method of claim 6 wherein said substituted 2-nitroethanol is 2,2-dimethyl-2-nitroethanol and said aromatic alcohol is p-chlorophenol.

9. The method of claim 5 wherein said tertiary amine is triethylamine.

* * * * *